(12) United States Patent
Moon

(10) Patent No.: US 8,524,391 B2
(45) Date of Patent: Sep. 3, 2013

(54) RECHARGEABLE BATTERY PACK

(75) Inventor: Daeyon Moon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 878 days.

(21) Appl. No.: 12/155,659

(22) Filed: Jun. 6, 2008

(65) Prior Publication Data

US 2009/0081538 A1    Mar. 26, 2009

(30) Foreign Application Priority Data

Sep. 20, 2007    (KR) .................. 10-2007-0096184

(51) Int. Cl.
*H01M 2/08*    (2006.01)
(52) U.S. Cl.
USPC ............ 429/175; 249/176; 249/170; 249/121
(58) Field of Classification Search
USPC .......................................... 429/176, 175, 121
See application file for complete search history.

(56) References Cited

U.S. PATENT DOCUMENTS

| | | | |
|---|---|---|---|
| 6,432,575 B1 * | 8/2002 | Yamagami | 429/100 |
| 7,396,600 B2 | 7/2008 | Watanabe et al. | |
| 7,556,533 B2 * | 7/2009 | Seo | 439/627 |
| 2007/0202396 A1 | 8/2007 | Jung | |

FOREIGN PATENT DOCUMENTS

| | | |
|---|---|---|
| CN | 1163988 C | 8/2004 |
| CN | 101030660 A | 9/2007 |
| EP | 1032060 B1 | 8/2006 |
| JP | 2000-285969 A | 10/2000 |
| JP | 2004-152670 | 5/2004 |
| JP | 2005-093189 A | 4/2005 |
| KR | 2000-0062499 A | 10/2000 |
| KR | 1020050082424 A | 8/2005 |
| KR | 1020050097699 A | 10/2005 |
| KR | 1020050103521 A | 10/2005 |
| KR | 10200700489420 A | 8/2007 |

* cited by examiner

*Primary Examiner* — Jane Rhee
(74) *Attorney, Agent, or Firm* — Robert E. Bushnell, Esq.

(57) ABSTRACT

A rechargeable battery pack including a cap cover through which a protection element may be easily mounted and a coupling terminal which is integrally manufactured when forming the cap cover includes: a bare cell having an electrode terminal; a cap cover coupled to a leading side of the electrode terminal of the bare cell, and on which a through hole is formed; a first coupling terminal attached to an external side of the cap cover; and a protection element accommodated in the cap cover, electrically connected to the electrode terminal via a first coupling lead, and electrically connected to the first coupling terminal via the through hole by a second coupling lead.

10 Claims, 4 Drawing Sheets

RECHARGEABLE BATTERY PACK

CLAIM OF PRIORITY

This application makes reference to, incorporates the same herein, and claims all benefits accruing under 35 U.S.C. §119 from an application for PACK TYPE RECHARGEABLE BATTERY earlier filed in the Korean Intellectual Property Office on the 20 Sep. 2007 and there duly assigned Serial No. 2007-0096184.

BACKGROUND OF THE INVENTION

1. Field of the Invention

The present invention relates to a rechargeable battery pack. More particularly, the present invention relates to a rechargeable battery pack including a cap cover on which a protection element can be easily mounted and a coupling terminal which is integrally manufactured when forming the cap cover.

2. Description of the Related Art

As the fields and demand for rechargeable batteries increase significantly, various methods for fabricating rechargeable batteries are being suggested. Among them, a battery pack is a good example. That is, a plurality of unit cells of the rechargeable battery are bound into a bundle and then used as one battery.

The battery pack is a battery in which a plurality of unit cells are bound as a bundle. A plurality of bare cells, or a plurality of core packs are electrically connected either serially or in parallel with each other and are then sealed within a pack case. Such a battery pack is used for increasing charging capability or a supply voltage, and is mainly used in devices, such as notebook computers, and in hybrid vehicles which need to be operated for a long time and be driven by a high capacity power source.

The bare cell of the battery pack has an identical structure to that of a unit cell. It includes a can, an electrode assembly accommodated inside the can, and a case for sealing the electrode assembly. As noted above, the rechargeable battery which is composed of a can, an electrode assembly and a case is called a bare cell, and the rechargeable battery is called a core pack when a protection circuit is attached to the bare cell.

In a prismatic rechargeable battery, there is a problem in that arranging a safety device is more difficult than arranging a safety device in cylinder type rechargeable battery due to restrictions of shape. That is, the cylinder type rechargeable battery has a safety device which blocks a flow of current by being ruptured when an internal pressure of a battery increases, but in the prismatic rechargeable battery, only a safety device including a safety vent and a temperature-responsive element is arranged. Furthermore, in a battery pack using the prismatic rechargeable battery, since a process for attaching a temperature-responsive element on the outside of the bare cell is very complicated, there are problems in that the manufacturing cost increases, and the yield reduces. However, if a temperature-responsive element is omitted in order to reduce the manufacturing cost and to increase the yield, then the safety of such a rechargeable battery is deteriorated tremendously. Therefore, a method and a structure for easily mounting a temperature-responsive element are urgently required.

SUMMARY OF THE INVENTION

Therefore, one aspect of the present invention is to provide a rechargeable battery pack including a cap cover through which a protection element can be easily mounted and a coupling terminal which is integrally manufactured when forming the cap cover.

Another aspect of the present invention is to provide a rechargeable battery pack in which a protection element is mounted on each of the core packs, and a protection element is easily mounted in order to reduce the manufacturing cost and to increase the stability of the rechargeable battery.

In order to accomplish above aspects, a rechargeable battery pack according to the present invention includes a bare cell having an electrode terminal; a cap cover coupled to a leading side of the electrode terminal of the bare cell, and on which a through hole is formed; a first coupling terminal attached to an external side of the cap cover; and a protection element accommodated in the cap cover, electrically connected to the electrode terminal via a first coupling lead, and electrically connected to the first coupling terminal via the through hole by a second coupling lead.

The first coupling terminal can be integrally formed with the cap cover.

One of either the first coupling terminal and the second coupling lead is bent to penetrate through the through hole.

The first coupling terminal may include a flat section and a recessed groove section which is bent to be exposed to an inner side of the cap cover via the through hole from the flat section.

The second coupling lead may be electrically connected to the recessed groove section exposed to the inside of the cap cover.

A second coupling terminal for electrically coupling the electrode terminal and the first coupling lead may be further included.

The cap cover may have an exposure terminal groove formed at a position corresponding to the electrode terminal.

The bare cell may further include a can, and the first coupling terminal may be electrically connected to the can of a neighboring bare cell.

A lead plate for coupling the first coupling terminal and the can of the neighboring bare cell be further included.

Other features and operations of the present invention as well as the above aspects will be apparent based on embodiments that will be explained with reference to the attached drawings.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, an embodiment of the present invention is explained in detail with reference to the attached drawings.

Figure 1:
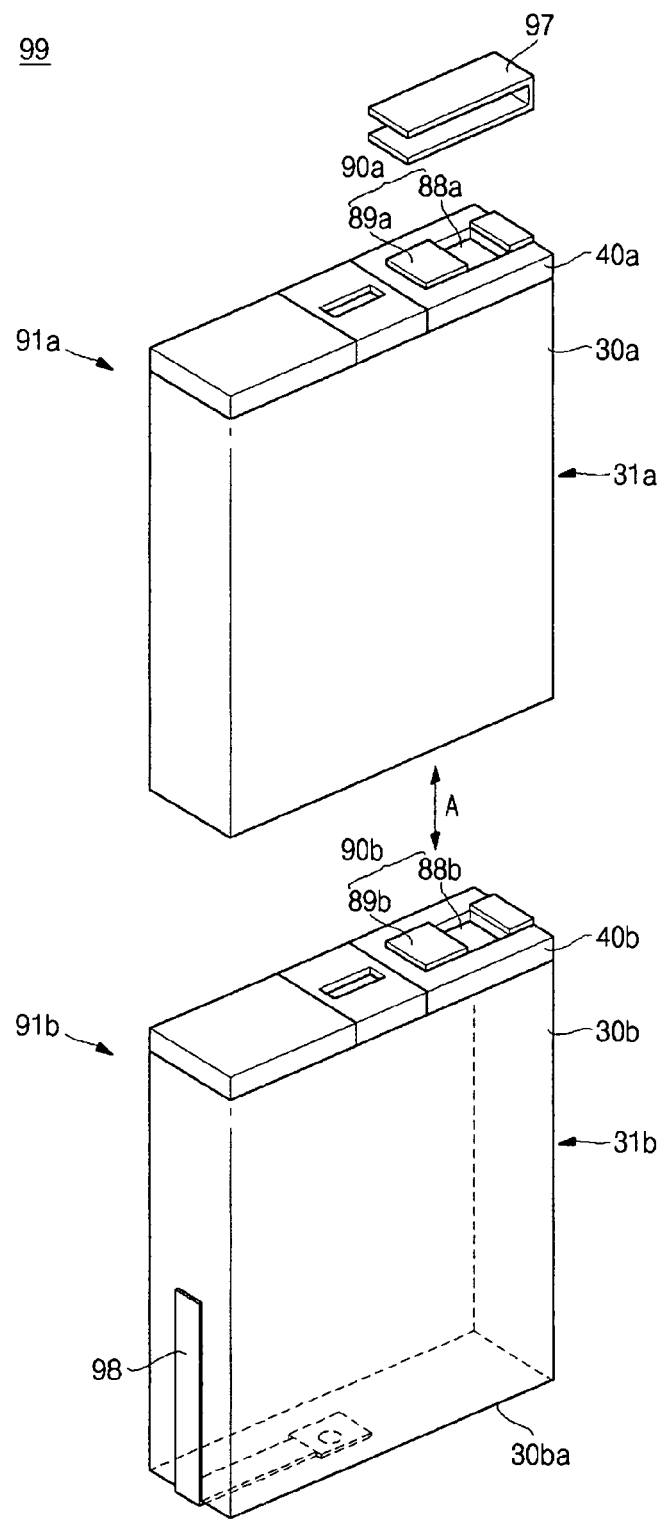
FIG. 1 is a perspective view of a prismatic battery pack according to an embodiment of the present invention.

FIG. 1 is a perspective view of a prismatic battery pack according to an embodiment of the present invention.

Referring to FIG. 1, a prismatic battery pack 99 according to an embodiment of the present invention is formed, for example, as two core packs electrically connected in series. The battery pack 99 according to an embodiment of the present invention includes a first core pack 91a, a second core pack 91b, a first electrode lead plate 97 and a second electrode lead plate 98. The dual battery pack 99 is suggested merely for convenient explanation, and it is possible to form the dual battery pack 99 as parallel connected or a serial-parallel connected battery core packs besides the serial connection thereof. The battery pack can be formed of more than two core packs.

The first core pack 91a and the second core pack 91b charge and discharge power, respectively. The first core pack 91a and the second core pack 91b respectively include: cans 30a and 30b formed as a container whose one side is open and may be used as either a positive electrode or a negative electrode; an electrode assembly (not illustrated) accommodated inside the cans 30a and 30b; a cap assembly (not illustrated) for sealing the opening of the cans 30a and 30b; and cap covers 40a and 40b. The cans 30a and 30b, the electrode assembly (not illustrated), and the cap assembly (not illustrated) are explained in more detail later referring to the drawings.

The first core pack 91a and the second core pack 91b are respectively formed by attaching the cap covers 40a and 40b to the bare cells 31a and 31b including the cans 30a and 30b, the electrode assembly (not illustrated), and the cap assembly (not illustrated). The first core pack 91a and the second core pack 91b are electrically connected serially or in parallel with each other depending on their usage. As illustrated in the drawing figures, the first core pack 91a and the second core pack 91b are connected to the outside via a first electrode lead plate 97 and a second electrode lead plate 98. However, the present invention is not limited thereto, and the number and the type of lead plates 97 and 98 may change depending on a coupling type and the coupling number of the core packs 91a and 91b. In addition, first coupling terminals 90a and 90b respectively including recessed groove sections 88a and 88b are formed in the cap covers 40a and 40b so that the cap covers 40a and 40b can be electrically connected to the lead plates 97 and 98 and other core packs. The first coupling terminals 90a and 90b can be used as negative electrodes if the cans 30a and 30b are used as positive electrodes.

Since the first electrode lead plate 97 is electrically connected to the first coupling terminal 90a of the first core pack 91a, it provides a conducting path between the outside and the battery pack 99. For this purpose, the first electrode lead plate 97 is formed by using one material selected from nickel Ni, copper Cu, aluminum Al, alloys thereof, and metals coated with the above materials. Furthermore, in FIG. 1, the first electrode lead plate 97 is bent and then folded, but the present invention is not limited to this.

Since the second electrode lead plate 98 is electrically connected to the can 30b of the second core pack 91b, it provides a conducting path between the outside and the battery pack 99. For this purpose, the second electrode lead plate 98 may be formed by using any of the materials used for forming the first electrode lead plate 97. Furthermore, in FIG. 1, the second electrode lead plate 98 is attached to the bottom 30ba of the bare cell 31b, but can be attached to any of the exposed sides of the can 30b, and an additional relay terminal may be used. However, the present invention is not limited to this.

Figure 2:
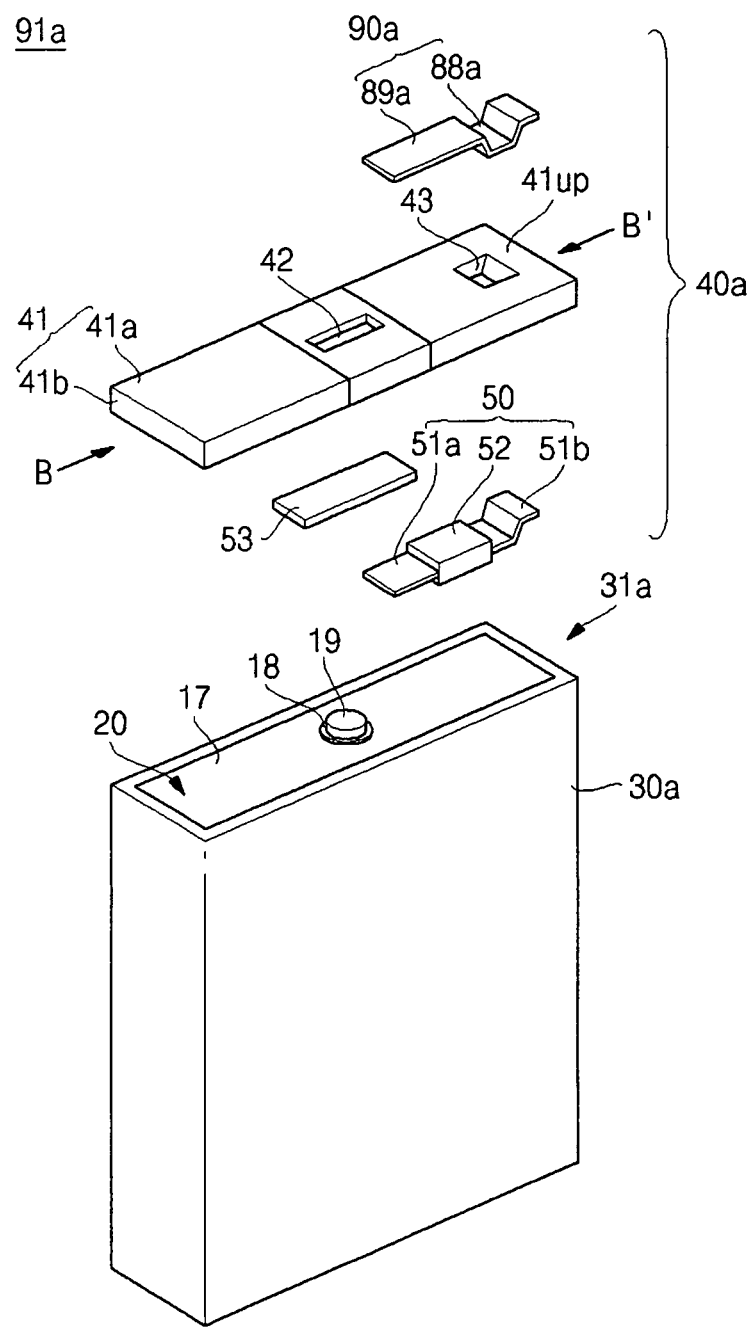
FIG. 2 is an exploded perspective view of a bare cell and a cap cover of FIG. 1.
Figure 3:
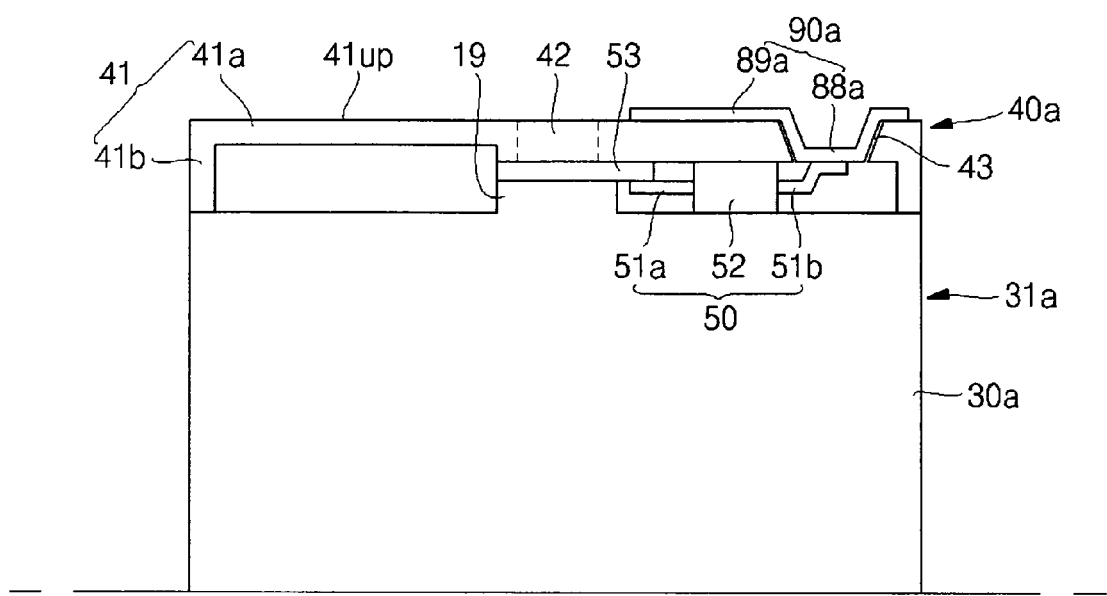
FIG. 3 is a cross-sectional view of a cap cover.

FIG. 2 is an exploded perspective view of a bare cell and a cap cover of FIG. 1. FIG. 3 is a cross-sectional view of a cap cover.

In FIG. 2 and FIG. 3, bare cell 31a and the cap cover 40a of the first core pack 91a are explained below as an example of the bare cell and the cap cover.

Referring to FIG. 2 and FIG. 3, the first core pack 91a includes: a bare cell 31a having an electrode terminal 19; and a cap cover 40a coupled to a leading side of the electrode terminal 19 of the bare cell 31a, and on which a through hole 43 is formed. The cap cover 40a includes an injection molding cover 41, a protection element 50 including a first coupling lead 51a and a second coupling lead 51b, a first coupling terminal 90a, and a second coupling terminal 53.

The injection molding cover 41 is coupled to one side of the bare cell 31a to accommodate the protection element 50, and the second coupling terminal 53. In particular, it is preferable that the injection molding cover 41 is coupled to the bare cell 31a to accommodate the side which has the electrode terminal 19 exposed inside the injection molding cover 41, but the present invention is not limited to this. For this end, the injection molding cover 41 is divided into a body 41a and a wing 41b, and is formed as cap shape or dish shape having an inner space by the body 41a and the wing 41b. In particular, the first coupling terminal 90a is arranged in the injection molding cover 41, and the through hole 43 is formed so that the recessed groove section 88a of the first coupling terminal 90a may be coupled to the second coupling lead 51b of the protection element 50. On the other hand, the injection molding cover 41 may be molded by injecting a plastic resin into a metal mold of the shape of the injection molding cover 41, and in this case, it becomes possible to form the first coupling terminal 90a in the metal mold additionally. That is, after inserting the first coupling terminal 90a, which is previously manufactured, into the metal mold, it is possible to form the injection molding cover 41 by injecting the plastic resin. If this method is employed, since it is not necessary to add the first coupling terminal 90a to the injection molding cover 41 by using an additional process, the whole process shortens, and coupling between the first coupling terminal 90a and the injection molding cover 41 may be easily established. An exposed terminal groove 42 that may draw out a terminal directly without passing through the protection element 50 may be further formed, but the present invention is not limited to this. It is preferable to use materials having flame resistance, and conductivity for the injection molding cover 41, and more preferably to use a material which can easily formed by injection molding. An epoxy, a polypropylene, a polypropylene terephthalate, a polyamide, a polybutylene terephthalate, a polycarbonate, a polyetheretherketone, and equivalent materials may be used as the materials of the injection molding cover 41, but the present invention is not limited to these materials.

The protection element 50 is arranged in the cap cover 40a, between the second coupling terminal 53 and the first coupling terminal 90a, and is electrically connected to the second coupling terminal 53 and the first coupling terminal 90a, respectively. For this end, the protection element 50 may include a temperature-responsive element 52, and a first coupling lead 51a and a second coupling lead 51b. The first coupling lead 51a electrically connects the second coupling terminal 53 and the temperature-responsive element 52, and the second coupling lead 51b electrically connects the temperature-responsive element 52 and the first coupling terminal 90a. In particular, as illustrated in FIG. 3, since the second coupling lead 51b is bent twice, it may be attached to one side of the recessed groove section 88a of the first coupling terminal 90a. However, the present invention is not limited to this, and first coupling lead 51a may be bent, or both of the first coupling lead 51a and the second coupling lead 51b may not be bent. In addition, both the second coupling terminal 53 and the first coupling lead 51a, and both the second coupling lead 51b and the first coupling terminal 90a may be attached together by resistance welding. The temperature-responsive element 52 is electrically connected to the second coupling terminal 53 and the first coupling terminal 90a via the first coupling lead 51a and the second coupling lead 51b. The temperature-responsive element 52 protects the bare cell 31a by blocking a flow of current when an overcurrent occurs due to a short, an overcharge, or an over-discharge of the bare cell 31a, or when the temperature of the bare cell 31a rises excessively. A positive temperature coefficient thermistor or a thermal fuse may be used as the temperature-responsive element 52, but the present invention is not limited to these devices.

The first coupling terminal 90a is attached to an external side of the cap cover 40a, to the upper side 41 up of the injection molding cover 41 to be coupled to other core packs or the outside. Since the first coupling terminal 90a is inserted into a metal mold when forming the injection molding cover 41, it may be integrally formed with the injection molding cover 41. The first coupling terminal 90a is divided into a flat section 89a and a recessed groove section 88a. The flat section 89a is a portion on which the first coupling terminal 90a is coupled to the injection molding cover 41 so as to fix by the injection molding cover 41, and the terminals of other core packs may be coupled to the flat section 89a, or a lead plate may be attached to the section 89a to be connected to the outside. The recessed groove section 88a is a shape which is collapsed from the flat section 89a, and penetrates through the through hole 43 formed in the injection molding cover 41, and then is coupled to the second coupling lead 51b of the protection element 50. For this end, the recessed groove section 88a is collapsed from the flat section 89a by more the thickness of the injection molding cover 41, and may be a circular shape or a pin shape as well as a prismatic shape as illustrated in the drawings. Resistance welding is used for the recessed groove section 88a and the second coupling lead 51b, and thus it is preferable that a bottom side of the recessed groove section 88a is planar. However, the present invention is not limited to this.

The second coupling terminal 53 electrically connects the first coupling lead 51a of the protection element 50 and the electrode terminal 19 of the bare cell 31a. The second coupling terminal 53 may be formed as a metal plate shape having a constant width, and it may be formed of nickel, copper, aluminum, iron, or equivalent metals thereof or compound metals thereof, but the present invention is not limited to these materials. In addition, the second coupling terminal 53 may be coupled to the first coupling lead 51a and the electrode terminal 19 by resistance welding, but the present invention is not limited to this.

On the other hand, a plurality of insulating plates or insulating sheets may be arranged between the cap cover 40a and the bare cell 31a for insulating them.

It is preferable that the through hole 43 illustrated in FIG. 2 and FIG. 3 is as big as the recessed groove section 88a so that the first coupling terminal 90a may penetrate through a body 41a of the injection molding cover 41. In particular, when forming the injection molding cover 41 as described in the explanation related to the first coupling terminal 90a, and adjusting the shapes of a metal case, it is not necessary to form an additional through hole 43.

When coupling the second coupling terminal 53 and the protection element 50, the first coupling lead 51a and the second coupling terminal 53 of the protection element 50 may be integrally formed. That is, the first coupling lead 51a may be directly attached to the electrode terminal 19 by forming the first coupling lead 51a long.

Figure 4:
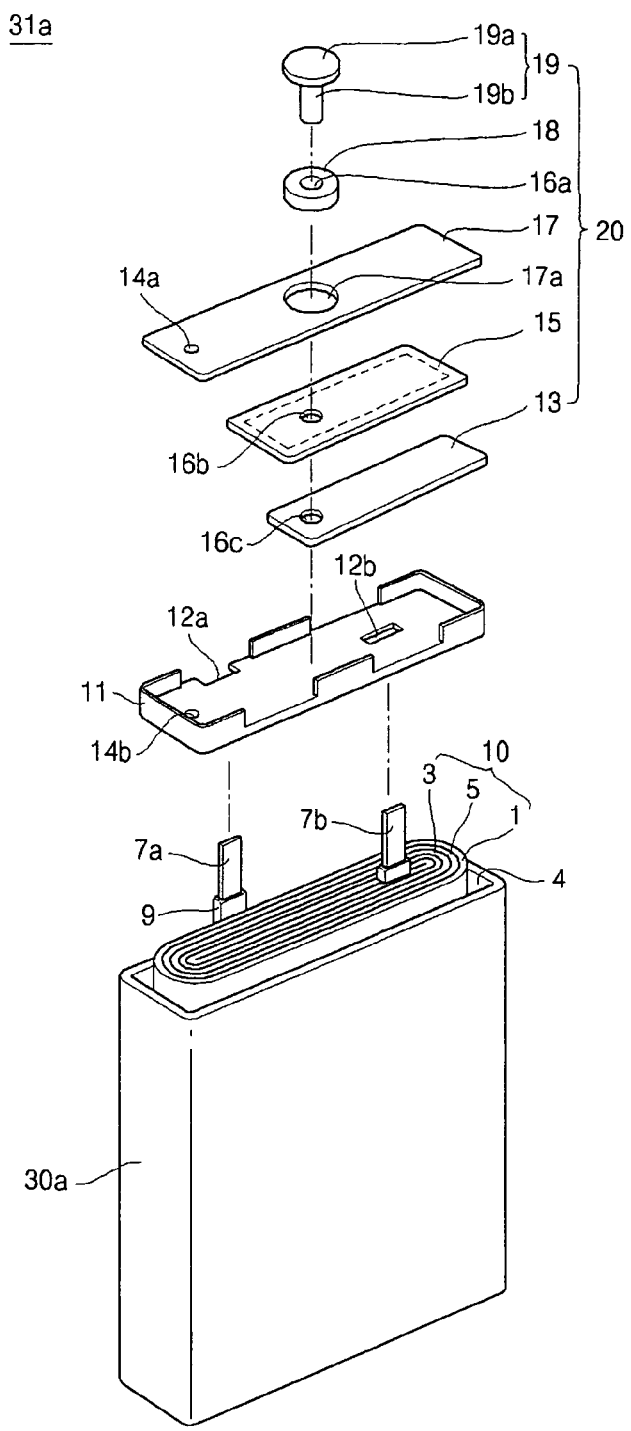
FIG. 4 is an exploded perspective view of a bare cell applicable to an embodiment of the present invention.

FIG. 4 is an exploded perspective view of a bare cell that may be used in an embodiment of the present invention.

In FIG. 4, the bare cell 31a is explained as an example of the bare cell.

Referring to FIG. 4, the bare cell 31a which may be used as a rechargeable battery according to an embodiment of the present invention includes a can 30a, an electrode assembly 10, an insulating case 11 and a cap assembly 20.

The can 30a is a container of a rectangular parallelepiped column (or well) shape, and as illustrated above, it may be easily manufactured by a dip drawing. The can 30a accommodates an electrode assembly 10, an insulating case 11, and a cap assembly 20 in the cavity 4, and is sealed by the cap plate 17 of the cap assembly 20. The can 30a is manufactured by using a metal having superior mechanical and electrical characteristics, such as thermal resistance, anti-abrasion, and conductivity. Aluminum, an aluminum alloy and metals equivalent thereto may be used to form the can 30a. However, the present invention is not limited to these metals, and different metals may be used according to usage and environment. Furthermore, the can 30a may be used as a negative electrode or a positive electrode of a rechargeable battery by allowing the can 30a to be coupled to the positive electrode tab 7a or the negative electrode tab 7b of the electrode assembly 10.

The electrode assembly 10 includes a positive electrode 1, a negative electrode 3, a separator 5, a positive electrode tab 7a, and a negative electrode tab 7b. In the electrode assembly 10, the positive electrode 1 and the negative electrode 3 are formed as wide plates or metal foil for increasing their electrical capacity, and the separator 5 may be inserted and stacked between the positive electrode 1 and the negative electrode 3. The electrode assembly 10 may be a jelly roll type in which the positive electrode 1, the negative electrode 3, and the separator 5 are wound. FIG. 4 illustrates the electrode assembly 10 of jelly roll type, but the present invention is not limited to this type.

The positive electrode 1 and the negative electrode 3 are manufactured by dry-coating an aluminum metal foil and a copper metal foil with slurry, respectively. The slurry includes a fixing agent for attaching an active material of each of the positive electrode 1 and the negative electrode 3 to a metal foil. An oxide containing lithium is used as an active material for a positive electrode, and one of hard carbon, soft carbon, graphite, and a carbon material is used as an active material for a negative electrode, but the present invention is not limited to this.

The separator 5 is arranged between the positive electrode 1 and the negative electrode 3 for insulating the positive electrode 1 from the negative electrode 3. The separator 5 provides a path through which ions may move between the positive electrode 1 and the negative electrode 3. The separator 5 may use any material selected from a porous polyethylene, polypropylene, polypropylene copolymer and equivalent materials thereof, or materials combining the above-mentioned materials, but the present invention is not limited to these materials. The separator 5 is wider than that of the positive electrode 1 and the negative electrode 3 for preventing shorts between the positive electrode 1 and the negative electrode 3.

The positive electrode tab 7a and the negative electrode tab 7b are electrically connected to a positive electrode 1 and a negative electrode 3 of the electrode assembly 10, respectively and are extend towards the open direction of the can 30a. The positive electrode tab 7a and the negative electrode tab 7b are electrically connected to the can 30a or the terminal plate 13 by penetrating via tab through holes 12a and 12b of the insulating case 11 fixed to an upper side of the electrode assembly 10 inside the can 30a. The positive electrode tab 7a and the negative electrode tab 7b are used as the primary conducting paths between an external circuit, or a device and the electrode assembly 10. An insulating tape 9 prevents electric shorts between the positive electrode tab 7a and the negative electrode tab 7b.

The insulating case 11 is accommodated into the can 30a when connecting to the can 30a to fix the electrode assembly 10 and insulates the can 30a with the cap assembly 20. In particular, the insulating case 11 has an accommodating space for the electrode assembly 10, and fills electrolyte into some parts of the accommodating space so that charging capacity of the bare cell 31a may be increasing. It is preferable that the insulating case 11 uses polymer resins having flame resistance, good insulating property, thermal resistance, and a predetermined degree of mechanical strength, as well as good moldability, but the present invention is not limited to this.

A cap assembly 20 includes a cap plate 17, an electrode terminal 19, an insulating plate 15, a terminal plate 13, and a gasket 18.

The cap plate 17 seals the opening of the can 30a when coupling the cap assembly 20 and the can 30a. The cap plate 17 is coupled to the opening of the can 30a by using a method such as welding. In addition, the cap plate 17 is electrically connected to any one of a positive electrode tab 7a and a negative electrode tab 7b that are drawn by penetrating via the tab through holes 12a and 12b of the insulating case 11. Furthermore, a terminal through hole 17a for coupling to the gasket 18 and an electrolyte injection hole 14a for injecting electrolyte are formed in the cap plate 17. An electrolyte injection hole 14b may be formed in the insulating case 11.

The gasket 18 is coupled to the terminal through hole 17a for insulating the electrode terminal 19 with the cap plate 17. A first terminal hole 16a is formed in the gasket 18 for coupling to the electrode terminal 19, and the electrode terminal 19 is coupled the gasket 18 by penetrating through the first terminal through hole 16a.

The electrolyte injection holes 14a and 14b are formed in the cap plate 17 and the insulating case 11, and are used as a path through which an electrolyte is injected into the can 30a inside. After the electrolyte is injected into the electrolyte injection hole 14a, the electrolyte injection hole 14a is sealed.

The insulating plate 15 is inserted between the cap plate 17 and the terminal plate 13 for insulating them. A second terminal hole 16b through which the electrode terminal 19 may penetrate is formed in the insulating plate 15.

The terminal plate 13 is electrically connected to the electrode terminal 19 via a third terminal hole 16c. The terminal plate 13 is electrically connected to one of the positive electrode tab 7a and the negative electrode tab 7b, that is, a terminal which is not coupled to the cap plate 17. When the cap plate 17 is electrically connected to the positive electrode tab 7a, the terminal plate 13 is electrically connected to the negative electrode tab 7b to electrically connect the electrode terminal 19 to the negative electrode tab 7b.

The electrode terminal 19 is used as one of a positive electrode or a negative electrode of a rechargeable battery along with the can 30a. The electrode terminal 19 is electrically connected to the terminal plate 13 via the first to third terminal holes 16a, 16b and 16c. The electrode terminal 19 is classified into a head 19a and a body 19b in order to allow part of the electrode terminal 19 to be exposed to outside of the cap plate 17. The head 19a and the body 19b are formed integrally, and the body 19b has smaller diameter than that of the head 19a, or has a shape different from that of the head 19a.

As illustrated above, the rechargeable battery pack according to an embodiment of the present invention provides the cap cover and the coupling terminal that is integrally manufactured when the cap cover is formed by injection molding and thus, the protection element may be easily mounted.

Since a protection element is mounted on each of the core packs composing the pack type rechargeable battery according to an embodiment of the present invention, safety of a rechargeable battery may be improved and the protection element may be easily mounted, thereby reducing manufacturing costs.

The embodiments discussed above are merely for explaining the technological concepts of the present invention, and the technological scope of the present invention is not limited to the above-mentioned embodiments. Furthermore, it is to be noted that various modifications may be realized by the person in the art to which the present invention belongs without deviating the scope of the present invention, which is claimed in the claims below within the spirit of the present invention.

What is claimed is:

1. A rechargeable battery pack comprising:
   a bare cell having an electrode terminal;
   a cap cover coupled to a leading side of the electrode terminal of the bare cell, a portion of said cap cover being perforated by a through hole;
   a first coupling terminal attached to an external side of the cap cover, a side of said first coupling terminal being in correspondence with the through hole; and
   a protection element accommodated within the cap cover and electrically connected to the electrode terminal via a first coupling lead, and electrically connected to the first coupling terminal via the through hole by a second coupling lead.

2. The rechargeable battery pack as claimed in claim 1, wherein the first coupling terminal is integrally formed with the cap cover.

3. The rechargeable battery pack as claimed in claim 1, wherein one of the first coupling terminal and the second coupling lead is bent to penetrate through the through hole.

4. The rechargeable battery pack as claimed in claim 1, wherein the first coupling terminal includes a flat section and a recessed groove section which is bent to be exposed to an inner side of the cap cover via the through hole from the flat section.

5. The rechargeable battery pack as claimed in claim 4, wherein the second coupling lead is electrically connected to the recessed groove section exposed to the inner side of the cap cover.

6. The rechargeable battery pack as claimed in claim 1, further comprising a second coupling terminal to electrically connect the electrode terminal to the first coupling lead.

7. The rechargeable battery pack as claimed in claim 1, wherein the cap cover includes an exposed terminal groove arranged at a position corresponding to the electrode terminal.

8. The rechargeable battery pack as claimed in claim 1, wherein the bare cell further includes a can, and wherein the first coupling terminal is electrically connected to the can of a neighboring bare cell.

9. The rechargeable battery pack as claimed in claim 8, further comprising a lead plate coupling the first coupling terminal to the can of the neighboring bare cell.

10. The rechargeable battery pack as claimed in claim 1, wherein a fractional length of one of the first coupling terminal and the second coupling lead comprises a knuckle providing an electrical conductor operationally extending through the through hole.

\* \* \* \* \*